Patented Jan. 9, 1923.

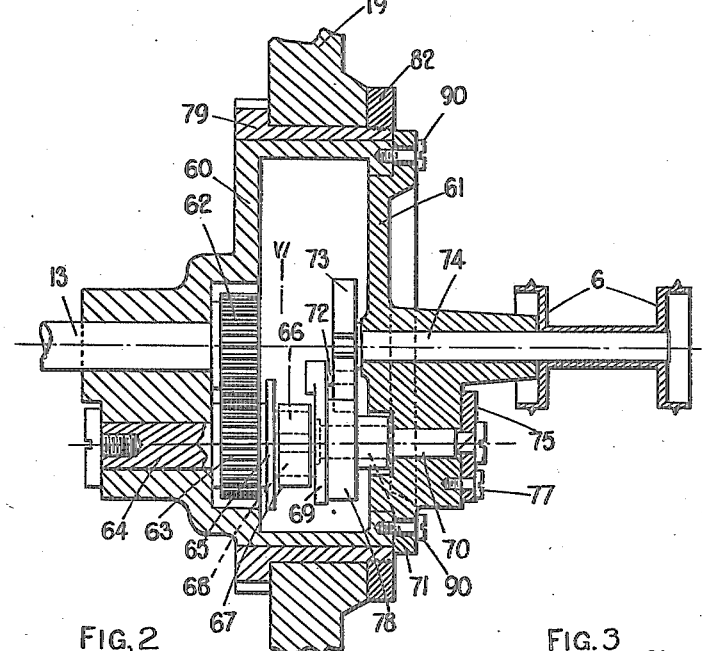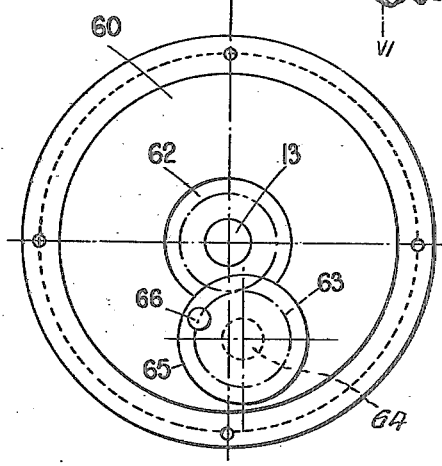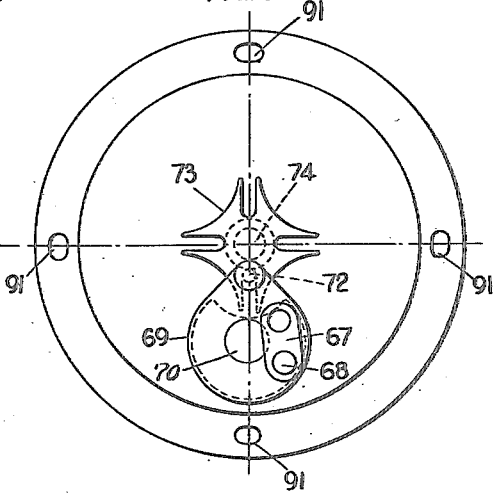

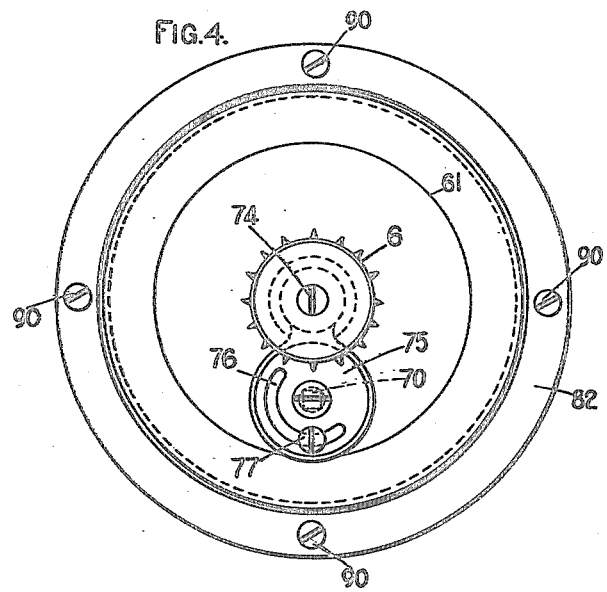
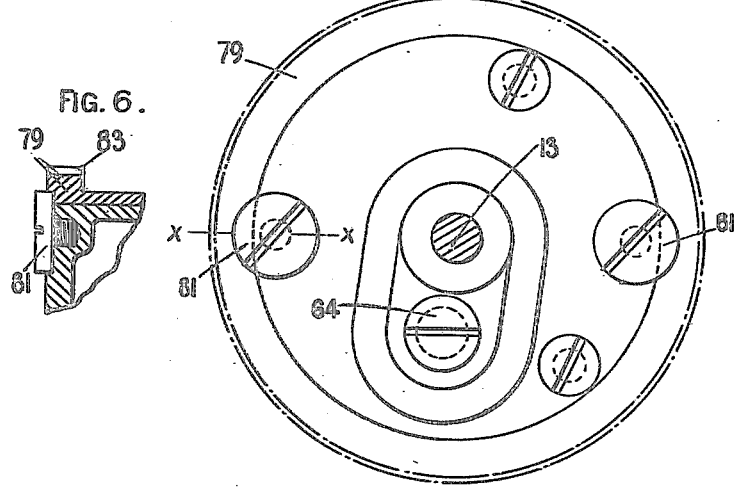

1,442,021

UNITED STATES PATENT OFFICE.

HAROLD WORKMAN, OF GLASGOW, SCOTLAND.

CINEMATOGRAPH PROJECTOR AND IN INTERMITTENT MECHANISM THEREFOR.

Application filed November 30, 1920. Serial No. 427,423.

*To all whom it may concern:*

Be it known that I, HAROLD WORKMAN, a subject of the King of Great Britain, and residing at 12 University Gardens, Glasgow, Scotland, have invented certain new and useful Improvements in Cinematograph Projectors and in Intermittent Mechanism Therefor, of which the following is a specification.

This invention relates to improvements in cinematograph projectors and in intermittent mechanism therefor, and more particularly to projectors in which the intermittent mechanism is of the Maltese cross type and in which the centering or "masking" of the picture is altered or adjusted by rotating the Maltese cross and finger wheel round the axis of the Maltese cross spindle. The object of the invention is to provide new and improved means and appliances whereby the shutter is adjusted automatically to correspond with the adjustment of the intermittent feed mechanism for masking purposes.

To this end the invention primarily consists in a cinematograph projector intermittent mechanism including a Maltese cross and finger wheel, in which the spindle which drives the intermittent mechanism is coaxial with the Maltese cross spindle, while means are provided for imparting a variable angular velocity to the finger wheel member, said finger wheel member being thus enabled to be turned about the axis of the driving spindle and the Maltese cross for centering the picture for masking purposes.

In the accompanying drawings:—

Figure 1 shows in sectional elevation the intermittent mechanism including the Maltese cross and the device for imparting a variable angular velocity to the finger wheel member.

Figure 2 is a face view of the parts of the mechanism shown in Figure 1, with the right-hand cover and the parts mounted thereon removed, so that what is seen corresponds to a section on the line VI—VI of Figure 1 looking from the right-hand side.

Figure 3 is a similar view looking from the left-hand side on the line VI—VI, and showing the parts mounted on the cover of the box.

Figure 4 is an elevation of the intermittent mechanism box and sprocket seen from the right-hand side in Figure 1.

Figure 5 is a similar view looking from the left-hand side in Figure 1.

Figure 6 is a detail view in section on the line X—X of Figure 5.

Referring now to Figures 1–5, 60 is the intermittent mechanism box and 61 is the cover plate thereof. The spindle 13 to which power is applied projects into the box and carries a pinion 62 at its end gearing with a pinion 63 mounted on a pin bearing 64. A face plate 65 carried by the pinion 63 has a crank pin 66 thereon connected by a link 67 with a crank pin 68 on a finger wheel member 69. This member is carried on a bearing pin 70, the part 71 whereof around which the member 69 turns, is slightly eccentric with respect to the portion of the member 70 which fits in the aperture in the cover plate 61. Consequently by turning the pin 70, the finger member can be adjusted for the precisely correct engagement of its finger 72 in the slots of the Maltese cross 73. The Maltese cross is directly mounted on the spindle 74 of the intermittent sprocket 6. The adjustment of the finger wheel member 69 by the turning of the pin 70 may conveniently be effected by forming the outer end of the pin 70 with a squared shank on which is fitted a disc 75, Figures 1 and 4, this disc being formed with a slot at 76 through which passes a set screw 77. By releasing the set screw 77 slightly the disc 75 is made free to be turned for adjusting the pin 70 until the engagement of the finger 72 with the Maltese cross 73 is precisely correct. The adjustment so effected is very slight in comparison with the relative displacement of the pins 64 and 70 which determines the accelerated movement of the finger member 69, so that it does not affect this acceleration appreciably.

It is to be noted that spindles 13 and 74 are directly in line, while the bearing pins 64 and 70 are out of line or eccentric one to another, although they are both at the same radial distance from the axes of the spindles 13 and 74. In Figures 2 and 3 the finger member 69 is shown as being on the vertical axis in the position in which its finger 72 is turning an arm of the Maltese cross 73, while the face plate 65 is seen to be displaced a short distance behind the vertical line through the axis of the spindle 13 in Figure 2. Owing to the relative eccentricity of the members 65 and 69 an accelerated movement is imparted to the finger member 69 during the time when its finger is turning the Maltese cross 73. while its movement in the remaining portion of its revolution while the Maltese cross is locked by the hub 78 of the finger member 69, is proportionately slower. It will be noted that the mechanism is mounted in the box 60 so that the driving spindle 13 can be coaxial with the driven spindle 74, owing to the interposition of the gears 62, 63, whereby the use of the mechanism for masking purposes is greatly facilitated. Again, it will be noted that owing to the relative positions selected for the crank pins 66 and 68, and the finger 72, the centres of the bearing pins 64 and 70 can be made to lie at the same radial distance from the axis of the spindles 13 and 74. This enables the degree of eccentricity of the axis 64 from the axis 70 to be varied by adjusting the cover plate circumferentially upon the box 60, whereby the degree of acceleration and deceleration imparted to the finger wheel member 69 can be varied when required, without affecting the operation of the Maltese cross mechanism or the drive of the crank disc 65. The screws 90 which hold the cover plate 61 pass through elongated holes indicated at 91 in Figure 3, in order to allow of this adjustment. The box 60, 61, is preferably made to contain oil so that the mechanism operates in an oil bath, the box itself being mounted in a revoluble sleeve 79 which turns in the main mechanism plate 19. The box is held locked in the sleeve 79 by means of screws 81 engaging in countersunk recesses in the box and the rim of the sleeve 79, as seen in Figure 6. If the recesses in which the screws 81 engage in the sleeve 79 are elongated, the sleeve 79 can be adjusted on the mechanism box 60 for adjusting the phase relation of the shutter with the intermittent mechanism independently of the automatic masking adjustment hereinafter described. This is not generally necessary however. The sleeve 79 is toothed at 83 on its left-hand end, while on its right-hand end screws a ring 82 by which the sleeve is held in the mechanism plate 19.
In some cases it may be necessary to turn the sprocket forwards or backwards through any angle up to 90° in order to vary the degree of eccentricity between the separate parts.
The turning of the mechanism box 60 through 90° or less will effect any necessary adjustment. This is the case as will readily be seen, as if the parts are assumed to be in the positions of Figures 1, 2 and 3, with the finger 72 engaging the Maltese cross, the whole mechanism in the box 60 will be carried round solidly as the box is turned, while if the hub portion 78 of the finger member had been engaging with one of the curved faces between a pair of slots of the Maltese cross 73, it would equally be carried round by the mechanism in the same way, and the same applies to any intermediate positions wherein the finger member 72 is part-way along one of the slots of the cross 73.

Having thus described my invention what I claim as new and desire to secure by Letters Patent is:—

1. In an intermittent mechanism of the Maltese cross type for use in a cinematograph projector, the combination of a driving spindle, an intermittently driven spindle with the Maltese cross thereon, said spindles being disposed co-axially, a mechanism box rotatable about the axis of said spindles, a finger wheel member adapted to actuate said Maltese cross and mounted in said mechanism box, a crank disc with gearing connecting it to said driving spindle within the mechanism box, said crank disc being disposed eccentrically with respect to said finger wheel member, and means of connexion between said crank disc and said finger wheel member whereby an accelerated movement is imparted to said finger wheel member in the part of its rotation in which it is operating said Maltese cross, and a retarded movement is imparted in the part of its rotation during which said Maltese cross is stationary, the centres of said crank disc and said finger wheel member being equidistant from the axis of the driving spindle and of the Maltese cross spindle, said mechanism box having a portion thereon on which one of said eccentrically mounted operating members is supported, adjustable with respect to the part of the mechanism box on which the other of said eccentrically mounted members is supported, whereby relative adjustments of the degree of eccentricity can be effected and the degree of acceleration and corresponding retardation can be varied when required.

2. In a cinematograph projector, the combination of an intermittent sprocket for moving the film, a driving spindle therefor disposed in line with said intermittent sprocket, a Maltese cross on said intermittent sprocket, a mechanism box mounted about the axis of rotation of said driving spindle and said intermittent sprocket and Maltese cross, a finger member revoluble on an axis in said mechanism box, a driving member for said finger member and gearing for turning said driving member from said driving spindle, said driving member and said finger member being mounted on axes out of line one with the other, crank pins on said driving member and said finger member, and a link connecting the same for transmitting the movement from the driving member to the finger member, said parts being so disposed as to impart an accelerated movement to said finger member in the part of its turning wherein it is moving said Maltese cross, said mechanism box being made in a plurality of parts one of which carries the driving spindle and driving member while another carries the Maltese cross and the finger member, said part carrying the Maltese cross and finger member being angularly adjustable with respect to the part carrying the driving spindle and driving member whereby the eccentricity of the finger member axis can be varied with respect to the axis of the driving member, and means for adjusting said finger member with respect to the Maltese cross for the purpose of insuring accurate engagement between said parts.

HAROLD WORKMAN.